(No Model.)
C. D. HARSIN.
DEVICE FOR TRANSPLANTING TREES.
No. 357,197. Patented Feb. 8, 1887.
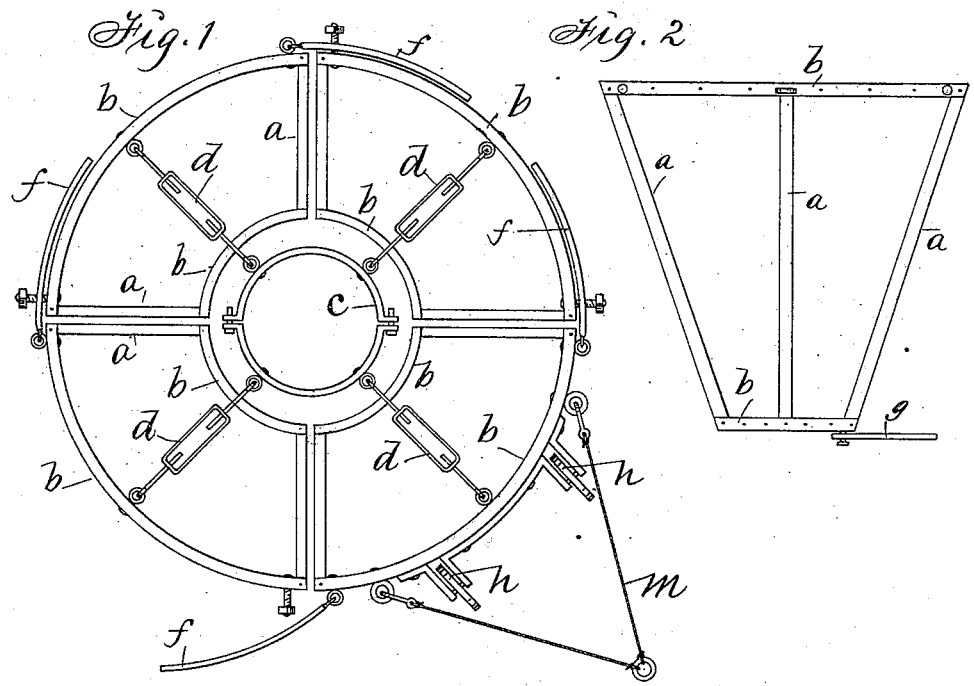
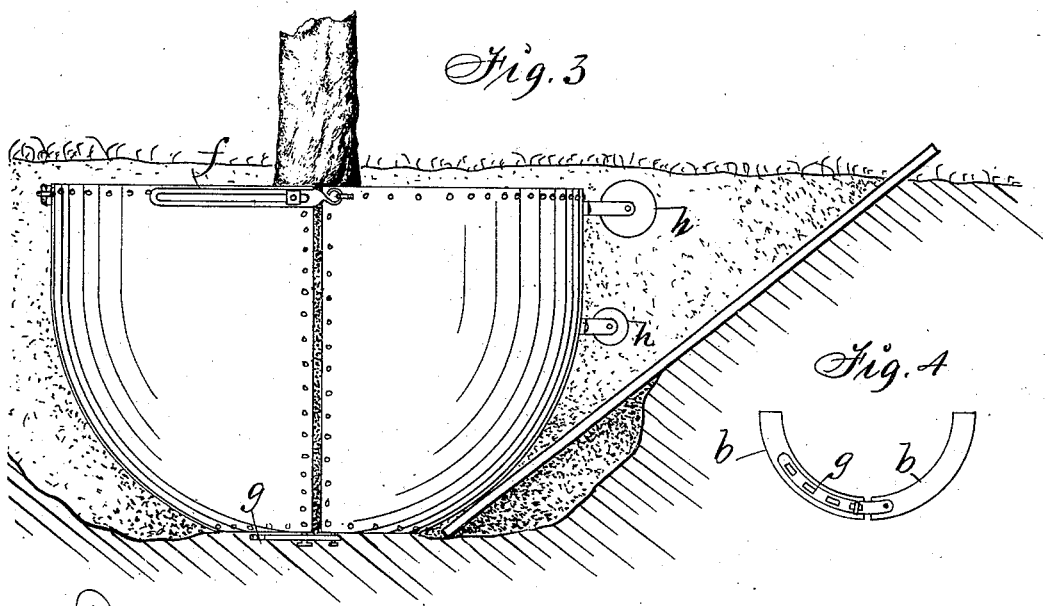
Witnesses:
O. U. Stiles
R. H. Orwig
Inventor:
Charles D. Harsin,
By Thomas G. Orwig, Atty.

UNITED STATES PATENT OFFICE.

CHARLES D. HARSIN, OF DES MOINES, IOWA.

DEVICE FOR TRANSPLANTING TREES.

SPECIFICATION forming part of Letters Patent No. 357,197, dated February 8, 1887.

Application filed July 2, 1886. Serial No. 206,911. (No model.)

*To all whom it may concern:*

Be it known that I, CHARLES D. HARSIN, a citizen of the United States of America, and a resident of Des Moines, in the county of Polk and State of Iowa, have invented a new and useful Device for Tranpslanting Trees, of which the following is a specification.

My object is to prevent trees from being damaged by exposing their roots while being moved, to facilitate the operation of transplanting, and to reduce the labor and cost incident thereto.

My invention consists in the construction and application of a sectional basket or case, as hereinafter set forth, pointed out in my claims, and illustrated in the accompanying drawings, in which—

Figure 1 is a top view of my device; Fig. 2, a side view of one of the sections. Fig. 3 shows the device in an excavation, inclosed around the roots of a tree. Fig. 4 is a bottom view of two sections coupled together.

$a\ a$ are the vertical bars, and $b\ b$ the horizontal bars, of a skeleton metal frame that is covered with sheet metal to produce a concavo-convex section of a basket or case that may vary in size as desired. The complete basket or case may be made of two, three, four, or more sections, of wood or metal, and flat or angular, in place of being curved.

$c$ is a metal ring, formed in sections in such a manner that it can be readily opened and placed around the body of a tree that is to be transplanted. Turn-buckles $d$ are flexibly and detachably connected with the ring $c$, and also with the separable sections of the case, by means of hooks and eyes, or in any suitable way in such a manner that the sections can be readily drawn toward the ring by simply turning the buckles.

$f$ is a hasp or coupling device, of any suitable kind, connected with the top of each section in such a manner that it can be extended over a contiguous section and clamped fast thereto by means of a screw-bolt and nut or other suitable fastening device, to lock two sections together at their top edges.

$g$ (clearly shown in Fig. 4) represents a coupling device pivoted to the bottom of one of the sections, by means of which the lower edges of two sections are detachably and adjustably connected.

$h\ h$ are rollers pivoted in bearers fixed to the outside of one of the sections of the basket or case.

$m$ represents a hitching device, to which a horse may be attached or a rope may be fastened to facilitate the movement of a tree when its roots are inclosed and clamped fast in the device.

In the practical use of my invention I excavate around the base and roots of a tree, as indicated in Fig. 3, and then place the ring $c$ around the trunk and fasten the sections of the case thereto in succession and couple them together at their bottoms as closely as possible. I next connect their top edges with the ring by means of the turn-buckles $d$, and thereby draw them together as close as I can, to inclose the ground and roots and to clamp the ground fast, so as to prevent the roots from becoming uncovered; and when the sections are thus drawn together around the butt and roots of the tree I fasten them together by means of the overlapping coupling devices $f$. To raise the tree and basket and ground inclosed therein out of the excavation, I place a plank in position, as shown in Fig. 3, and then incline the tree so as to bring the rollers $h$ upon the solid track produced by the plank, and then apply horse-power or man-power to the hitching device $m$ to pull the basket and its load up to the level surface, from whence it can be removed by the same means to the spot where it is to be replanted, or placed upon a truck to be carried to any distant point desired without danger of exposing and damaging the roots. To replant a tree thus moved I simply set basket and tree in an excavation and then remove the basket by sections and fill in ground around the protected roots and butt of the tree. When the ground is dry, it will be advantageous to wet it before and after moving the tree, to prevent the roots from becoming dry and the ground from loosening therefrom.

I claim as my invention—

1. A device for transplanting trees, composed of a basket or case formed in detachable sections having coupling devices at their tops and bottoms, a sectional ring adapted to be placed around the trunk of a tree, and turn-buckles or their equivalents for connecting the sections with the ring, for the purposes stated.

2. The rollers $h$, in combination with a section of a separable basket or case, for the purposes specified.

3. The hitching device $m$ and the rollers $h$, in combination with a sectional basket or case to operate in the manner set forth, for the purposes stated.

4. The basket or case sections consisting of frames $a\,b$, having fixed covers and coupling devices, the sectional ring $c$, and the turnbuckles $d$, arranged and combined to operate in the manner set forth, for the purposes stated.

CHARLES D. HARSIN.

Witnesses:
C. W. STILES,
THOMAS G. ORWIG.